(12) United States Patent
Whitlock et al.

(10) Patent No.: US 9,908,637 B2
(45) Date of Patent: Mar. 6, 2018

(54) MODIFIED SHANK FASTENERS FOR ELECTROMAGNETIC EFFECT (EME) TECHNOLOGY

(71) Applicant: The Boeing Company, Chicago, IL (US)

(72) Inventors: Richard P. Whitlock, Seattle, WA (US); Peter A. Coronado, Renton, WA (US); Omar J. Pacheco Agosto, Renton, WA (US); Michael H. E. Ware, Renton, WA (US)

(73) Assignee: The Boeing Company, Chicago, IL (US)

( * ) Notice: Subject to any disclaimer, the term of this patent is extended or adjusted under 35 U.S.C. 154(b) by 341 days.

(21) Appl. No.: 14/286,612

(22) Filed: May 23, 2014

(65) Prior Publication Data

US 2015/0337885 A1 Nov. 26, 2015

(51) Int. Cl.
*B64D 45/02* (2006.01)
*F16B 33/06* (2006.01)
*F16B 35/04* (2006.01)

(52) U.S. Cl.
CPC .............. *B64D 45/02* (2013.01); *F16B 33/06* (2013.01); *F16B 35/048* (2013.01); *Y10T 29/49886* (2015.01)

(58) Field of Classification Search
CPC ......... B64D 45/02; F16B 33/06; F16B 35/048
USPC ................. 411/424, 902, 903, 914
See application file for complete search history.

(56) References Cited

U.S. PATENT DOCUMENTS

| | | | | |
|---|---|---|---|---|
| 3,396,996 A | * | 8/1968 | Raptis | F16B 33/004 403/408.1 |
| 3,630,253 A | * | 12/1971 | Sherman | F16B 4/004 403/408.1 |
| 3,962,775 A | * | 6/1976 | King, Jr. | B23P 9/025 29/445 |
| 3,983,304 A | * | 9/1976 | Sekhon | C09D 161/06 29/34 B |
| 4,054,045 A | * | 10/1977 | King, Jr. | B21J 15/022 15/104.05 |
| 4,074,011 A | * | 2/1978 | Teramae | C23C 22/83 106/14.12 |
| 4,281,044 A | * | 7/1981 | Walters | C08J 5/12 428/460 |
| 4,623,016 A | | 11/1986 | Klaucic | |
| 4,755,904 A | * | 7/1988 | Brick | B64D 45/02 244/1 A |
| 5,685,680 A | * | 11/1997 | Duffy | B05D 3/12 219/99 |
| 6,007,286 A | * | 12/1999 | Toyota | F16H 57/041 411/428 |

(Continued)

FOREIGN PATENT DOCUMENTS

| EP | 0685389 A1 | 12/1995 |
|---|---|---|
| EP | 2406336 A1 | 1/2012 |

(Continued)

*Primary Examiner* — Gary W Estremsky
(74) *Attorney, Agent, or Firm* — Felix L. Fischer

(57) ABSTRACT

A fastener system for composite structure providing electromagnetic energy protection has a shank with a threaded portion on a first end of the shank terminating in a lead-in portion. A head is present on a second end of the shank. The shank is adapted for intimate conductive contact with an inner surface of an interference fit hole.

13 Claims, 7 Drawing Sheets

(56) References Cited

U.S. PATENT DOCUMENTS

| | | | | |
|---|---|---|---|---|
| 6,025,081 | A * | 2/2000 | Ohshiro | B32B 15/01 384/912 |
| 6,129,996 | A * | 10/2000 | Cordy | B32B 15/017 148/243 |
| 6,190,102 | B1 * | 2/2001 | Vignotto | B60B 3/165 301/105.1 |
| 6,599,071 | B1 * | 7/2003 | McCauley | B60B 3/16 411/378 |
| 7,599,164 | B2 | 10/2009 | Heeter et al. | |
| 7,695,226 | B2 | 4/2010 | March et al. | |
| 7,755,876 | B2 | 7/2010 | Morrill et al. | |
| 7,842,403 | B2 * | 11/2010 | Meyer, Jr. | B05D 1/36 411/548 |
| 7,976,258 | B2 * | 7/2011 | Asai | C23C 28/023 411/424 |
| 2003/0219328 | A1 | 11/2003 | Schultz | |
| 2005/0226701 | A1 * | 10/2005 | Craven | F16B 35/065 411/399 |
| 2008/0075555 | A1 * | 3/2008 | March | F16B 5/02 411/361 |
| 2010/0270513 | A1 | 10/2010 | Haylock et al. | |
| 2010/0272537 | A1 * | 10/2010 | Haylock | F16B 39/01 411/80.1 |
| 2011/0036621 | A1 * | 2/2011 | Kobayashi | C23C 2/28 174/257 |
| 2011/0142567 | A1 * | 6/2011 | Haylock | B64D 45/02 411/360 |
| 2012/0070249 | A1 * | 3/2012 | Meyer | F16B 33/06 411/411 |
| 2012/0201999 | A1 * | 8/2012 | Woods | F16B 4/004 428/99 |
| 2014/0055906 | A1 | 2/2014 | Whitlock | |
| 2014/0130335 | A1 | 5/2014 | Bickford | |

FOREIGN PATENT DOCUMENTS

| | | |
|---|---|---|
| FR | 2672091 A1 | 7/1992 |
| GB | 2212580 A | 7/1989 |
| WO | 2011050040 A1 | 4/2011 |

* cited by examiner

MODIFIED SHANK FASTENERS FOR ELECTROMAGNETIC EFFECT (EME) TECHNOLOGY

FIELD

Embodiments of the disclosure relate generally to the field of fastener technologies for metal fasteners employed in composite structures and more particularly to a fastener with treatments of the shank to achieve increased lubricity with enhanced conductivity.

BACKGROUND

Lightweight composite materials are employed for major structures in aircraft on a regular basis. Fiber composites provide a significant improvement in specific strength and stiffness over conventional metal alloys. Better specific strength and stiffness translates into weight savings, which translates into fuel savings and lower operating costs. Additionally, composites do not corrode like aluminum, and they are more resistant to fatigue. However, composite structures in these aircraft do not readily conduct away the extreme electrical currents and electromagnetic forces generated by lightning strikes.

Structural fabrication using composites still requires fasteners for many assembly operations. Metallic fasteners are conductive creating electromagnetic effect (EME) design considerations for lightning strike and other EME issues. Fastener sparking modes must be designed for lightning conditions including Hot Particle Ejection (HPE) and arcing between an outer surface of the fastener head and other structure or fastener sleeves.

When lightning strikes a Carbon Fiber Reinforced Polymer (CFRP) structure with metallic fasteners installed, a significant portion of the current may pass into nearby structures through the fasteners. When the electrical energy passes between two surfaces, contact resistance heating may break down the materials and generate hot gas (or plasma) in the hole, or in the space in-between a fastener and an associated internally threaded fastener such as a nut or frangible collar.

Sleeved fasteners are currently employed in many composite structures as a combined solution to lightning protection and structural requirements providing an interference fit between the fastener and an associated hole in the composite joint. However, sleeves create additional weight in the structure, additional cost and time in assembly and may have additional failure modes.

It is therefore desirable to provide a fastening system suitable for composite structural applications which overcomes both FIFE and arcing while overcoming the drawbacks of the prior art fastener installation procedures providing an interference fit without requirements for sleeves.

SUMMARY

Embodiments disclosed herein provide a fastener system for composite structure providing electromagnetic energy protection having a shank with a threaded portion on a first end of the shank terminating in a lead-in portion. A head is present on a second end of the shank. The shank is adapted for intimate conductive contact with an inner surface of an interference fit hole.

The embodiments provide a method for EME protection of fasteners in composite structures wherein a hole is identified in a composite joint for installation of a fastener. A fastener diameter is established and a shank of the fastener is configured for an interference fit in the hole. A lubricious coating is deposited on a threaded portion and lead-in portion of the fastener. The fastener is then inserted into the hole forming with the interference fit an intimate conductive contact between the shank and hole. Electrical energy may then be transferred during an EME event.

The features, functions, and advantages that have been discussed can be achieved independently in various embodiments of the present disclosure or may be combined in yet other embodiments further details of which can be seen with reference to the following description and drawings.

DETAILED DESCRIPTION

The present embodiments provide intimate conductive contact by the fastener without the use of a sleeve for various EME protection requirements including lightning strike, High Intensity Radiated Fields, Fault Currents, Precipitation Static and Functional Grounding. An initial embodiment provides a fastener with a roughened shank surface onto which a dry lubricious coating is added. The roughened shank would then be polished to expose the fastener base metal in the peaks and keep the lubricious coating in the valleys. This ensures enough conductivity to maintaining a bond path for the high current densities of lightning energy as well as lubricity for interference fit installation. A second embodiment provides a fastener shank with two modifications. A lubricating coating is added to at least the lead-in geometry of the fastener with the remainder of the shank being coated with a soft metal. The lubricating coating on the fastener provides enough lubricity to ensure fastener can be installed into interference fit holes while the soft metal ensures good electrical bond while also aiding the installation. In both embodiments the interference fit installation may be accomplished without a sleeve and reduces voids between the fastener and structure preventing the ionization of air in voids to form HPE.

Figure 1:
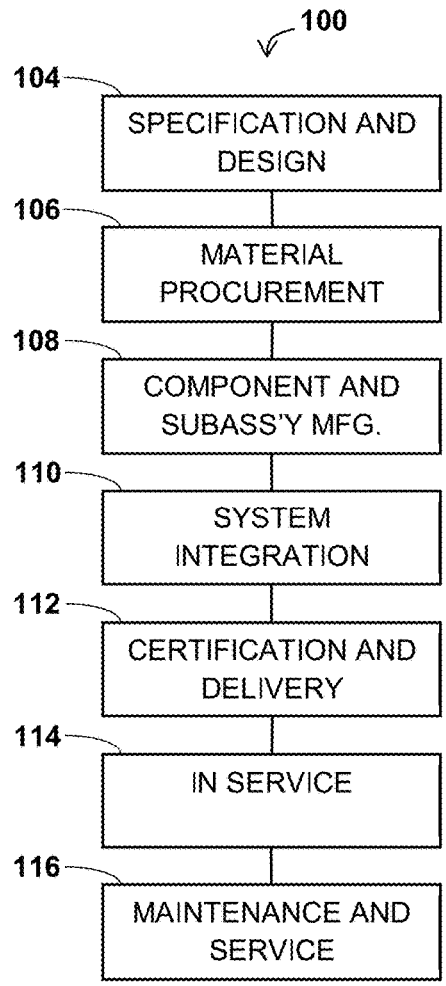
FIG. 1 is a flow diagram of aircraft production and service methodology.
Figure 2:
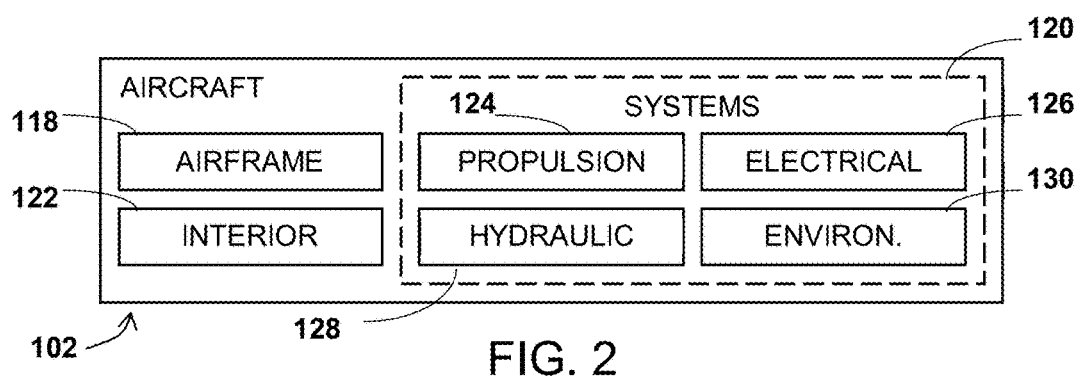
FIG. 2 is a block diagram of an aircraft.

Referring to the drawings, embodiments of the disclosure may be described in the context of an aircraft manufacturing and service method 100 as shown in FIG. 1 and an aircraft 102 as shown in FIG. 2. During pre-production, exemplary method 100 may include specification and design 104 of the aircraft 102 and material procurement 106. During production, component and subassembly manufacturing 108 and system integration 110 of the aircraft 102 takes place.

Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128 and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

The embodiments described herein provide a fastener system providing EME protection available for use in assembly requirements in the methods or systems of an aircraft as defined in FIGS. 1 and 2 and described above or any similar structural assembly.

Figure 3:
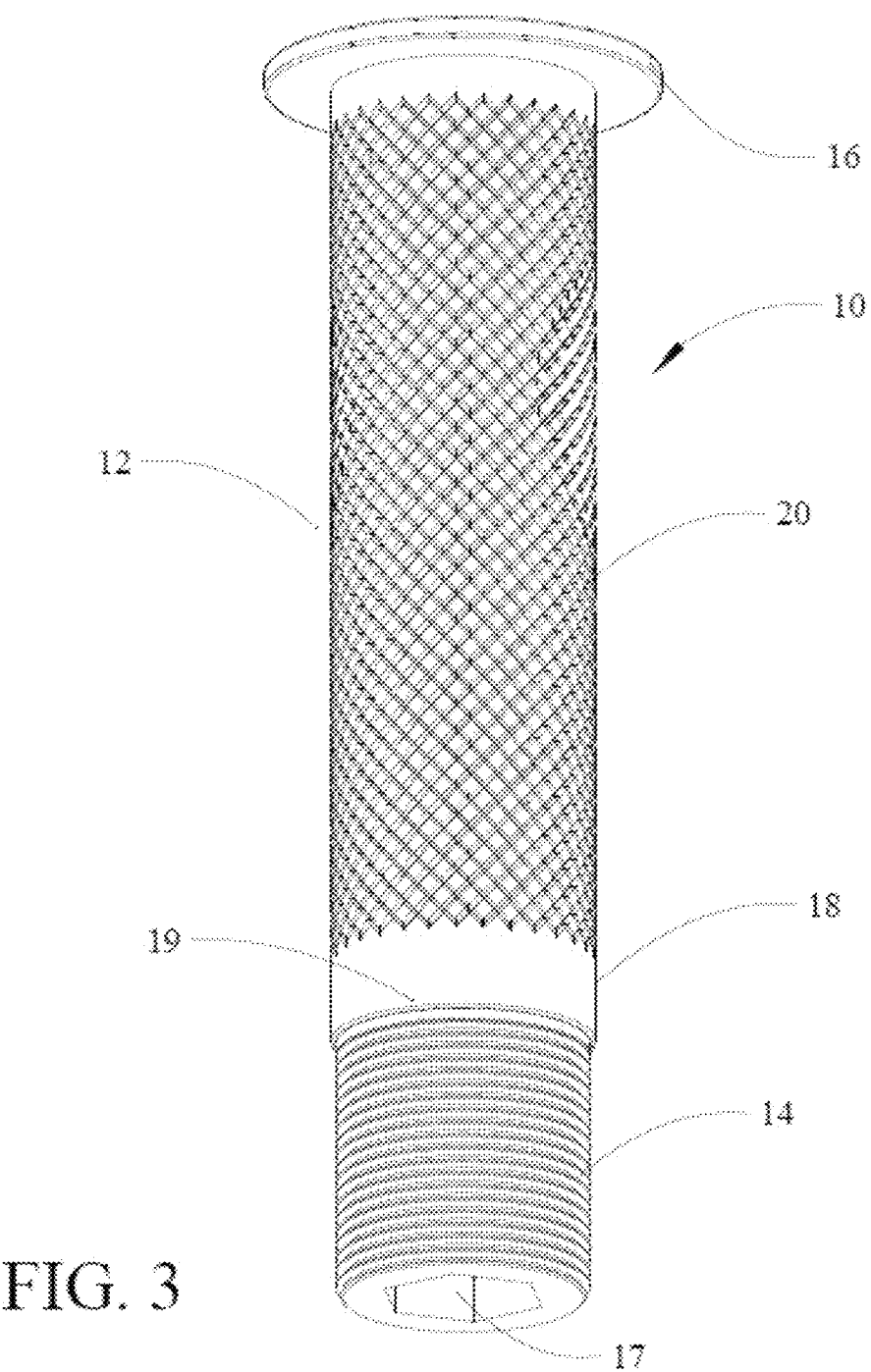
FIG. 3 is a perspective view of a first embodiment with a knurled shank having an applied lubricious coating.
Figure 4:
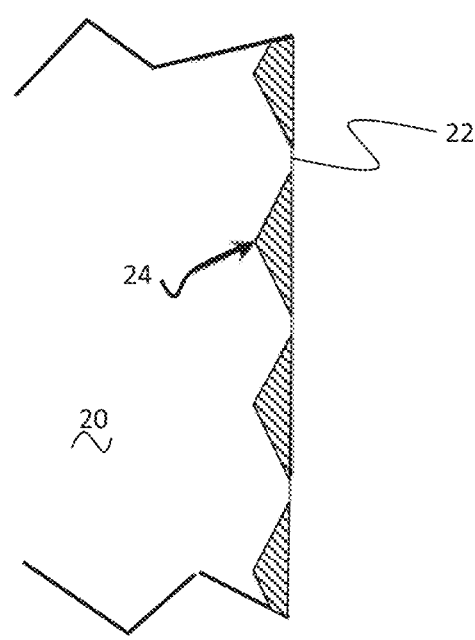
FIG. 4 is a detailed section view of the knurling in the shank with the lubricious coating

As shown in FIG. 3, a first embodiment of the fastener system incorporates a fastener 10 having a shank 12 with a threaded portion 14 on a first end and a head 16 on a second end. An anti-rotation feature such as a hex bore 17 may be included in the fastener for use during installation of a nut on the threaded portion 14. A lead-in portion 18 provides transition from the threaded portion 14 into the main body 20 of the shank 12. The lead-in portion 18 may incorporate a rounded shoulder 19 or taper to transitionally engage the main body of the shank and inner surface of the hole in an interference fit. The main body 20 incorporates a roughened surface which may be created by knurling or similar machining procedures. In exemplary embodiments, the peak-to-valley height should be between 0.0002 inch and 0.001 inch. A dry coating that is lubricious is added to the fastener including the knurling on the main body. For exemplary embodiments, the dry coating is "aluminum pigmented coating", which in the example embodiment is phenolic resin based (as the matrix), and contains lubricating pigments, typically aluminum flake or particle such as BMS10-85 Phenolic based aluminum pigmented coating. Corrosion prevention additives may also be employed. In alternative embodiments epoxy based coatings, and other solid film lubricants that are resin or ceramic based, with solid lubricant additives may be employed. The knurled shank is polished to remove coating from knurl peaks 22 but retain the coating in knurl valleys 24 as shown in FIG. 4. The lubricious surface area on the shank main body in the knurl valleys as well as the threaded portion and geometry of the lead-in portion 18 is configured to adapt the fastener 10 to be inserted in a hole in a composite structure with an interference fit to expand the inner surface of the hole without damaging the composite. However, the contact surface area of the burnished peaks of the knurled shank main body provide intimate electrical conductive contact between the fastener and the hole surface allowing electrical energy transfer with large current densities as will be described in greater detail subsequently.

Figure 5:
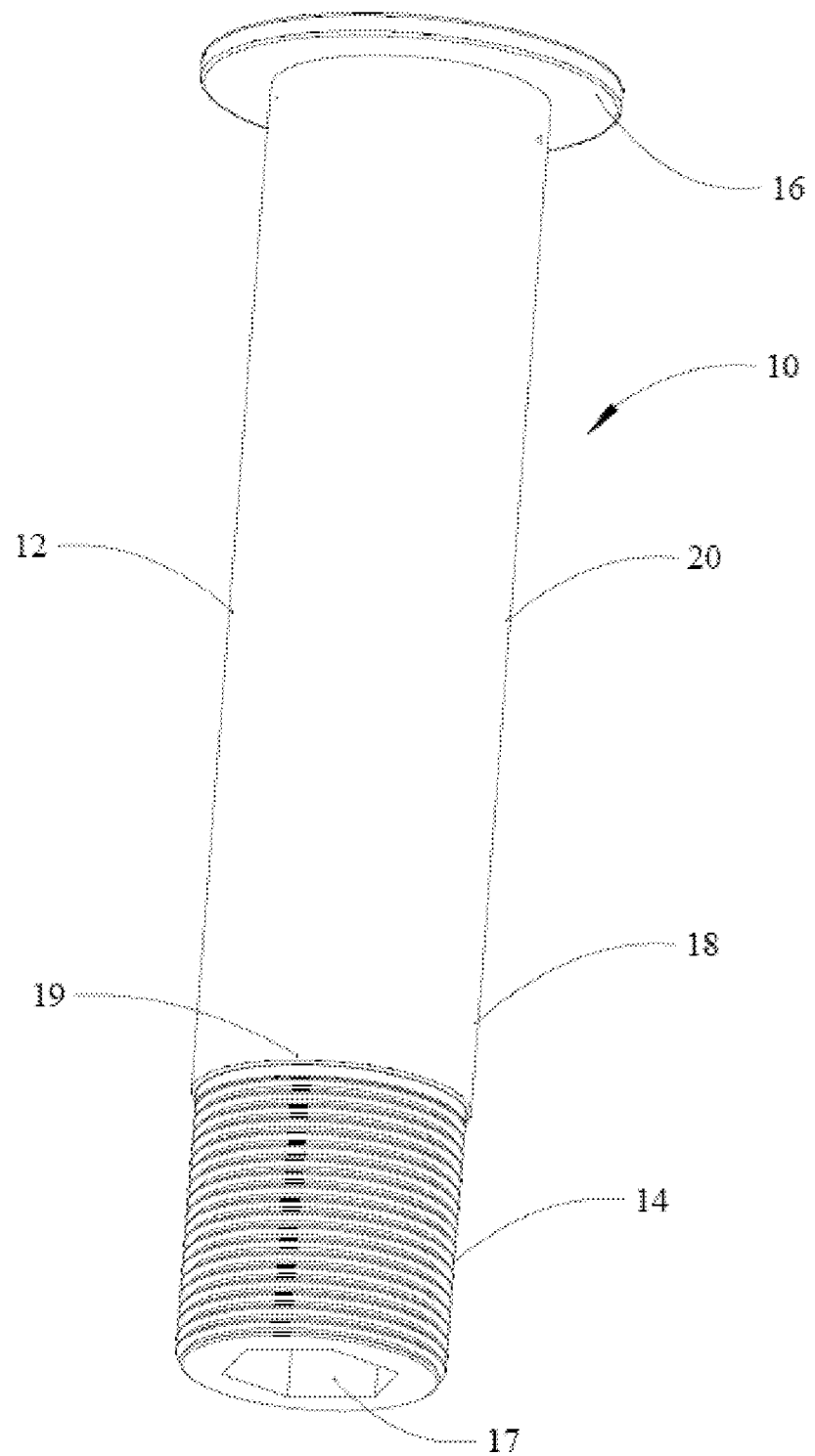
FIG. 5 is a perspective view of a second embodiment with a lubricious coating on the threads and lead-in portion of the shank with a soft metal coating on the shank between the lead-in portion and the head.
Figure 6:
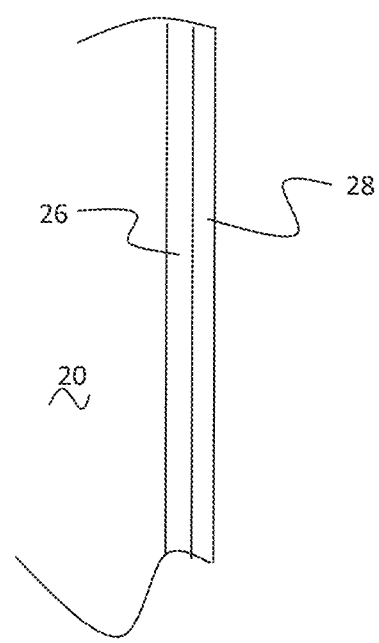
FIG. 6 is a detailed section view of the coated main body of the shank.

A second embodiment is shown in FIGS. 5 and 6. As in the first embodiment, the fastener 10 incorporates a shank 12 with a threaded portion 14 on a first end and a head 16 on a second end. A lead-in portion 18 provides transition from the threaded portion 14 into the main body 20 of the shank 12. The threaded portion 14 and lead-in portion 18 are coated with a dry (and galvanically compatible) coating that is lubricious such as a BMS10-85 Phenolic based aluminum pigmented coating. The coating maybe applied by dip, spray or other standard organic coating techniques. The main body 20 is coated with a multiple layer metallic laminate. For exemplary embodiments with titanium fasteners, an adhesion layer 26 is deposited on at least the main body 20. In an exemplary embodiment a nickel strike is employed as the adhesion layer. In alternative embodiments, a copper or iron strike may be employed and the adhesion layer could be applied by a vacuum deposition process instead of electrodeposition. A soft metal layer 28 is then deposited over the adhesion layer as shown in FIG. 6. For exemplary embodiments a tin-zinc-bismuth alloy is employed. In alternative embodiments, tin-bismuth may be employed. In the former, the soft metal layer 28 is approximately 65% tin with approximately 32-33% zinc, the remainder bismuth. The tin-zinc, alloy is a standard cadmium replacement coating that is known in the art. In the latter, the soft metal layer is not as sacrificial, but could be wet installed to compensate. For tin-based coatings, the bismuth helps with the prevention or retardation of tin pest, a low temperature transformation of tin into a brittle phase. Also, solid additives could be added to the coating such as PTFE or boron nitride that aid in lubricity in stackups that contain CFRP. The lubricious coating on the threaded portion 14 and lead-in portion 18 of the fastener 10 allows initial insertion into the interference fit hole. The tin-zinc-bismuth is soft providing low shear resistance for continuing insertion of the main body 20 of the fastener into the interference fit hole. However, the tin-zinc-bismuth alloy is highly conductive and provides intimate electrical contact between the fastener and the hole surface. Alternative embodiments may employ alloys based on indium such as tin-indium or zinc-indium, which are soft and galvanically compatible with aluminum, Alloys such as tin-aluminum are possible via vacuum deposition or special plating solutions. Coatings that can be deposited by thermal spray processing such as aluminum-polyester or aluminum-boron nitride, may be employed in alternative embodiments without the use of an adhesion layer.

Figure 7:
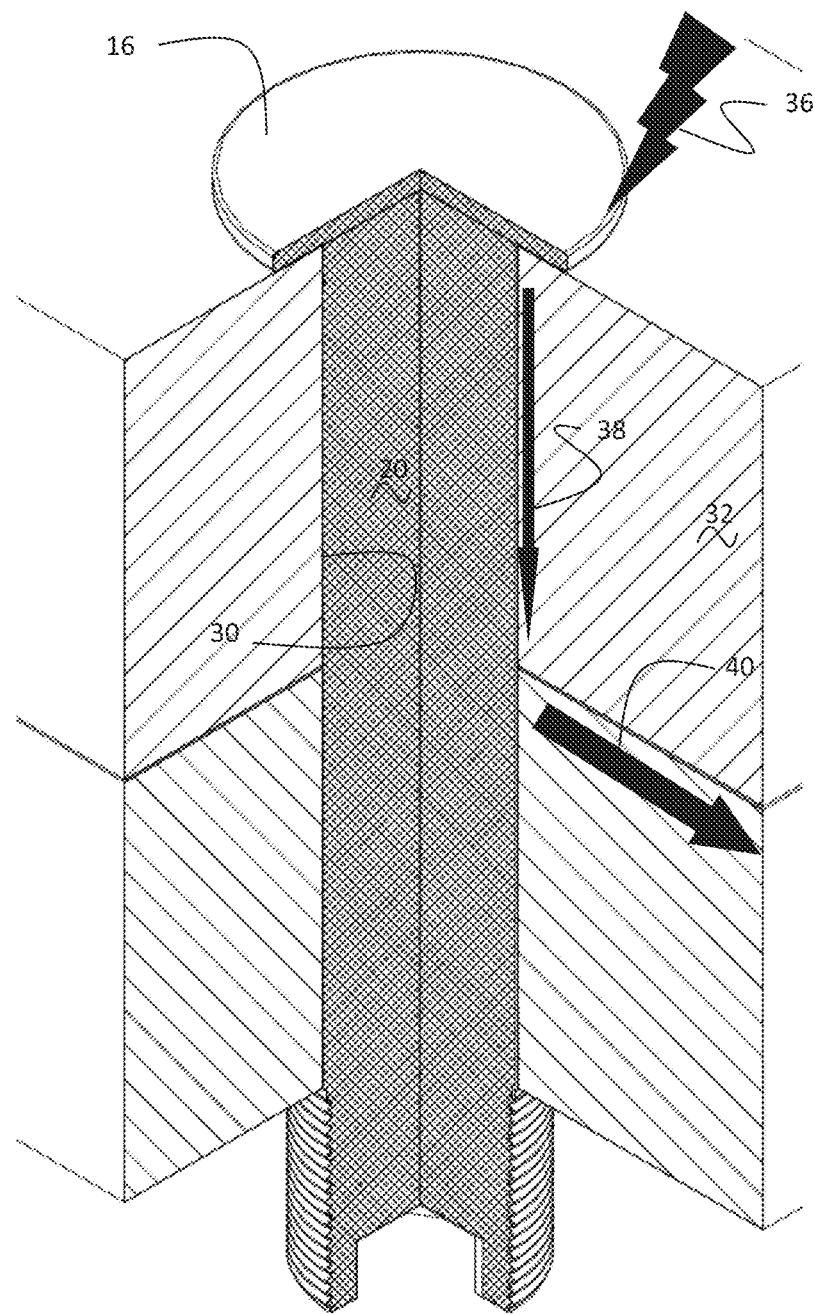
FIG. 7 is a partial section view of a fastener of either the first embodiment or the second embodiment installed with interference fit in a hole in a composite joint; and, FIG. 8 is a flow chart of a method for employing a fastener system with EME protection as defined in the embodiments.

As shown in FIG. 7, either of the embodiments for the fastener 10 described above is inserted in a hole 30 in a joint incorporating a composite layer 32. In particularly advantageous joint configurations where one joined element is a metallic sub structure 34 such as a fuel tank wall adjacent the composite layer, the present embodiments provide intimate contact between the fastener 10 and the interior surface of the hole 30 which extends through both the composite layer 32 and metallic sub structure 34. In a lightning strike or other EME event which may have large current densities (resulting from currents of 100-200 KA peak in lightning strike conditions), charge 36 attaching to the head 16 is conducted down the fastener 10, exposed fastener metal as in the peaks of the knurled main body and/or metal coating layers such as the nickel and tin-zinc-bismuth as represented by arrow 38 and from the fastener through the metal coating or exposed fastener metal to the metallic sub structure 34 as represented by arrow 40. The combination of the intimate conductive contact provided by either the exposed metal in the knurled peaks 22 or the soft metallic layer 28 allows a ready path for electrical energy transfer associated with large current densities up to $1.5 \times 10^6$ amp/in$^2$ required by the EME event and the interference fit prevents voids between the fastener and hole structure to suppress HPE formation. While the embodiments described herein are detailed relative to threaded fasteners, for other fastener systems, such as blind fasteners may be employed in alternative embodiments.

Figure 8:
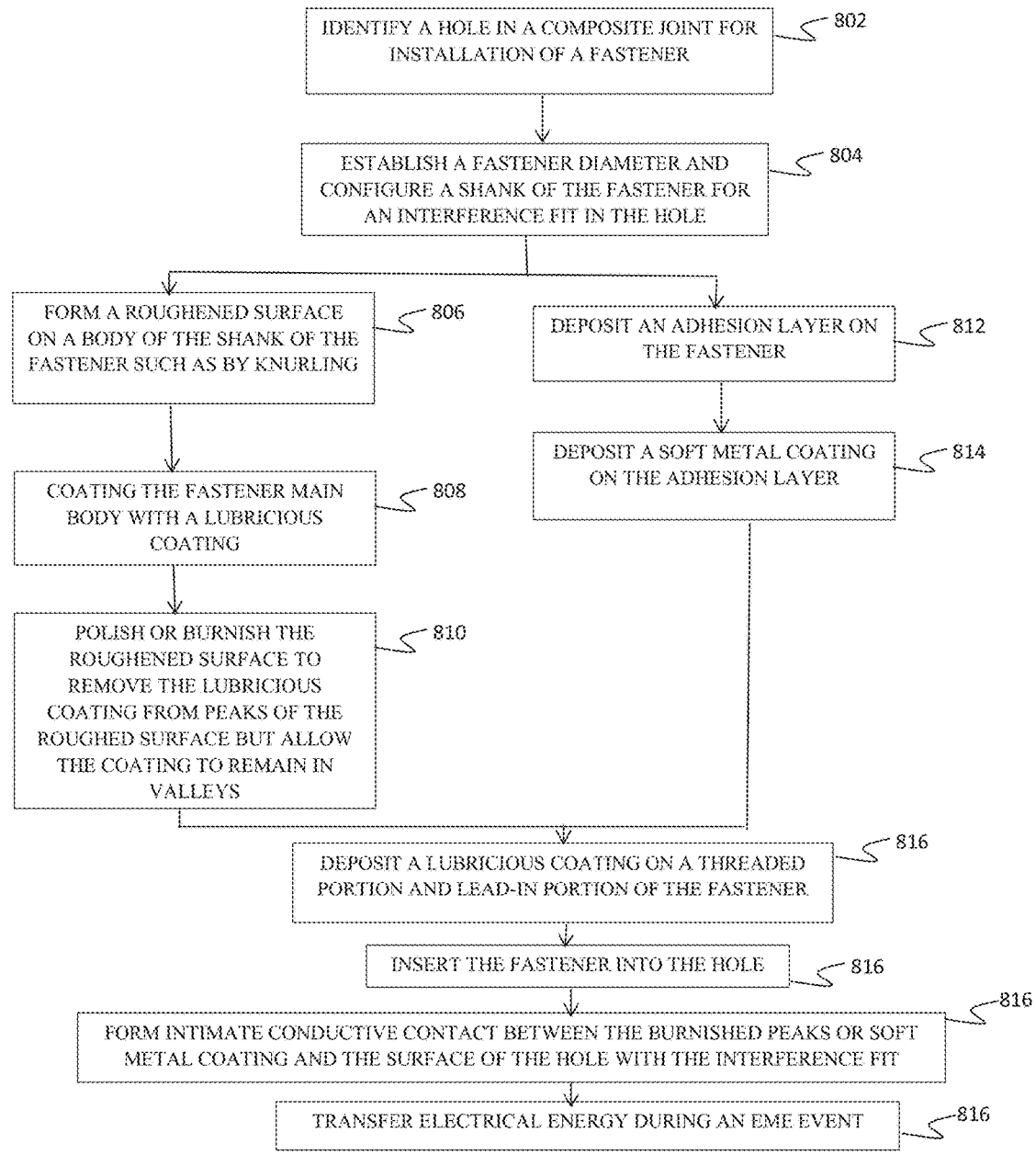

As shown in FIG. 8 the embodiments described herein may be employed for EME protection of an installed fastener by identifying a hole in a composite joint for installation of a fastener, step 802. A fastener diameter is established and a shank of the fastener configured for an interference fit in the hole, step 804. A roughened surface is formed on a body of the shank of the fastener such as by knurling, step 806. The fastener main body is coated with a lubricious coating, step 808. Polishing or burnishing the roughened surface removes the lubricious coating from peaks of the roughed surface but allows the coating to remain in valleys, step 810. Alternatively an adhesion layer is deposited on the fastener, step 812, and a soft metal coating is deposited on the adhesion layer, step 814. A lubricious coating is deposited on a threaded portion and lead-in portion of the fastener, step 816. The fastener is then inserted into the hole, step 818, with the interference fit forming intimate conductive contact between the burnished peaks or soft metal coating and the surface of the hole, step 820, for electrical energy transfer, step 822, during an EME event.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A fastener system for composite structure comprising;
 a shank having a roughened main body with peaks and valleys;
 a lubricious coating on the main body said coating polished for exposure of the peaks
 a threaded portion on a first end of the shank with a lead-in portion transitioning between the threaded portion and the main body; and,
 a head on a second end of the shank;
 wherein the shank is configured for intimate conductive contact with an inner surface of an interference fit hole in a composite with the lead-in portion transitionally engaging the main body with an inner surface of the hole, the peaks maintaining intimate conductive contact, the lubricious coating remaining present in the valleys for lubricious insertion of the main body into the interference fit hole.

2. The fastener system as defined in claim 1 wherein the lead-in portion is configured to expand the inner surface of the interference fit hole without damaging the composite.

3. The fastener system as defined in claim 2 wherein the shank is adapted to be in intimate conductive contact with the inner surface of the hole to conduct large current densities.

4. The fastener system as defined in claim 1 wherein the threaded portion and the lead in portion are coated in dry lubricant.

5. The fastener system as defined in claim 1 wherein the roughened main body is knurled.

6. The fastener system as defined in claim 1 wherein the lubricious coating is one of a phenolic resin base containing lubricating pigments, epoxy based coatings, and other solid film lubricants that are resin or ceramic based, with solid lubricant additives.

7. A method for EME protection of fasteners in composite structures comprising:
 identifying a hole in a composite joint for installation of a fastener having a threaded portion on a first end of the shank terminating in a lead-in portion and a head on a second end of the shank;
 establishing a fastener diameter for an interference fit in the hole;
 forming a roughened surface on a main body of the shank of a fastener with peaks having the established diameter;
 coating the fastener main body with a lubricious coating;
 polishing the roughened surface to remove the lubricious coating from the peaks of the roughed surface but allowing the coating to remain in valleys said peaks adapted for an interference fit in the hole maintaining intimate conductive contact, the lubricious coating remaining present in the valleys for lubricious insertion into the hole;
 inserting the fastener into the hole;
 transitionally engaging the main body with an inner surface of the hole with a lead-in portion to provide the interference fit;
 forming with the interference fit an intimate conductive contact between the shank and hole; and,
 transferring electrical energy from the peaks to a surface of the hole during an EME event.

8. The method of claim 7 wherein the step of forming a roughened surface comprises knurling the main body of the shank.

9. The method of claim 7 wherein the step of coating the fastener main body with a lubricious coating comprises applying a dry aluminum pigmented coating.

10. The method as defined in claim 9 where in the aluminum pigmented coating comprises a phenolic resin containing aluminum flakes or particles.

11. The method of claim 7 wherein the step of coating the fastener main body with a lubricious coating comprises applying a coating selected from an epoxy based coating or solid film lubricant having a resin or ceramic base.

12. The method of claim 7 wherein the step of identifying a hole in a composite structure comprises identifying a hole in a composite structure in a production process for installation of a fastener having a threaded portion on a first end of the shank terminating in a lead-in portion and a head on a second end of the shank.

13. The method of claim 7 wherein the step of identifying a hole in a composite structure comprises identifying a hole in a composite structure in a maintenance process for installation of a fastener having a threaded portion on a first end of the shank terminating in a lead-in portion and a head on a second end of the shank.

\* \* \* \* \*